United States Patent [19]

Hattori et al.

[11] Patent Number: 4,724,308

[45] Date of Patent: Feb. 9, 1988

[54] REWIND CONTROL UNIT FOR A TAPE READER

[75] Inventors: Seiichi Hattori; Yutaka Mizuno, both of Hachioji; Kunio Kanda, Kunitachi, all of Japan

[73] Assignee: Fanuc Ltd., Minamitsuru, Japan

[21] Appl. No.: 756,986

[22] PCT Filed: Nov. 2, 1984

[86] PCT No.: PCT/JP84/00529

§ 371 Date: Jul. 2, 1985

§ 102(e) Date: Jul. 2, 1985

[87] PCT Pub. No.: WO85/02045

PCT Pub. Date: May 9, 1985

[30] Foreign Application Priority Data

Nov. 2, 1983 [JP] Japan .................. 58-206394

[51] Int. Cl.⁴ .................................... G06K 7/10
[52] U.S. Cl. .................................. 235/458; 235/480; 178/95
[58] Field of Search ............. 360/74.4, 74.5, 74.6, 360/72.3; 178/95, 112; 235/458, 462, 480

[56] References Cited

U.S. PATENT DOCUMENTS

| | | | |
|---|---|---|---|
| Re. 31,501 | 1/1984 | Lorenzo | 235/458 X |
| 3,274,574 | 9/1966 | Miller et al. | 360/74.5 X |
| 3,317,660 | 5/1967 | Simms | 178/95 X |
| 3,569,674 | 3/1971 | Becker et al. | 235/480 |
| 4,154,396 | 5/1979 | Kirkham | 235/458 |
| 4,237,498 | 12/1980 | van Eijck et al. | 360/74.4 |
| 4,608,705 | 8/1986 | Tanaka | 360/74.6 X |

FOREIGN PATENT DOCUMENTS 48-43053 12/1973 Japan.
52-94105 8/1977 Japan.
53-89711 8/1978 Japan.

Primary Examiner—David L. Trafton
Attorney, Agent, or Firm—Staas & Halsey

[57] ABSTRACT

A low power consumption type tape reader permits miniaturization of reel motors and ensures stopping a tape (3) at a first rewind stop code, even if the response of a brake magnet (11) is somewhat poor. When a rewind command is received, the rotational speed of a capstan motor (12) is switched from a forward low speed to a reverse low speed, and then a feed magnet (14) is actuated to rewind the tape (3). The rotational speed of the capstan motor (12) is gradually increased to a reverse high speed. When a rewind stop code is detected, the speed of the capstan motor (12) is gradually decreased to the reverse low speed, and then the brake magnet (11) is actuated to stop the feed of the tape (3) temporarily. A reversible counter (40) stores the number of rewind stop codes detected during the time interval between the detection of the first rewind stop code and the temporary stopping of the feed of the tape (3). After the tape (3) has stopped, the speed of the capstan motor (12) is switched to the forward low speed. When the forward low speed is reached, the feed magnet (14) is actuated to feed the tape (3) in the forward direction, and the number of detected rewind stop codes is subtracted from the contents of the reversible counter (40). When the contents of the reversible counter becomes zero, the brake magnet (11) is actuated to stop the feed of the tape (3).

6 Claims, 6 Drawing Figures

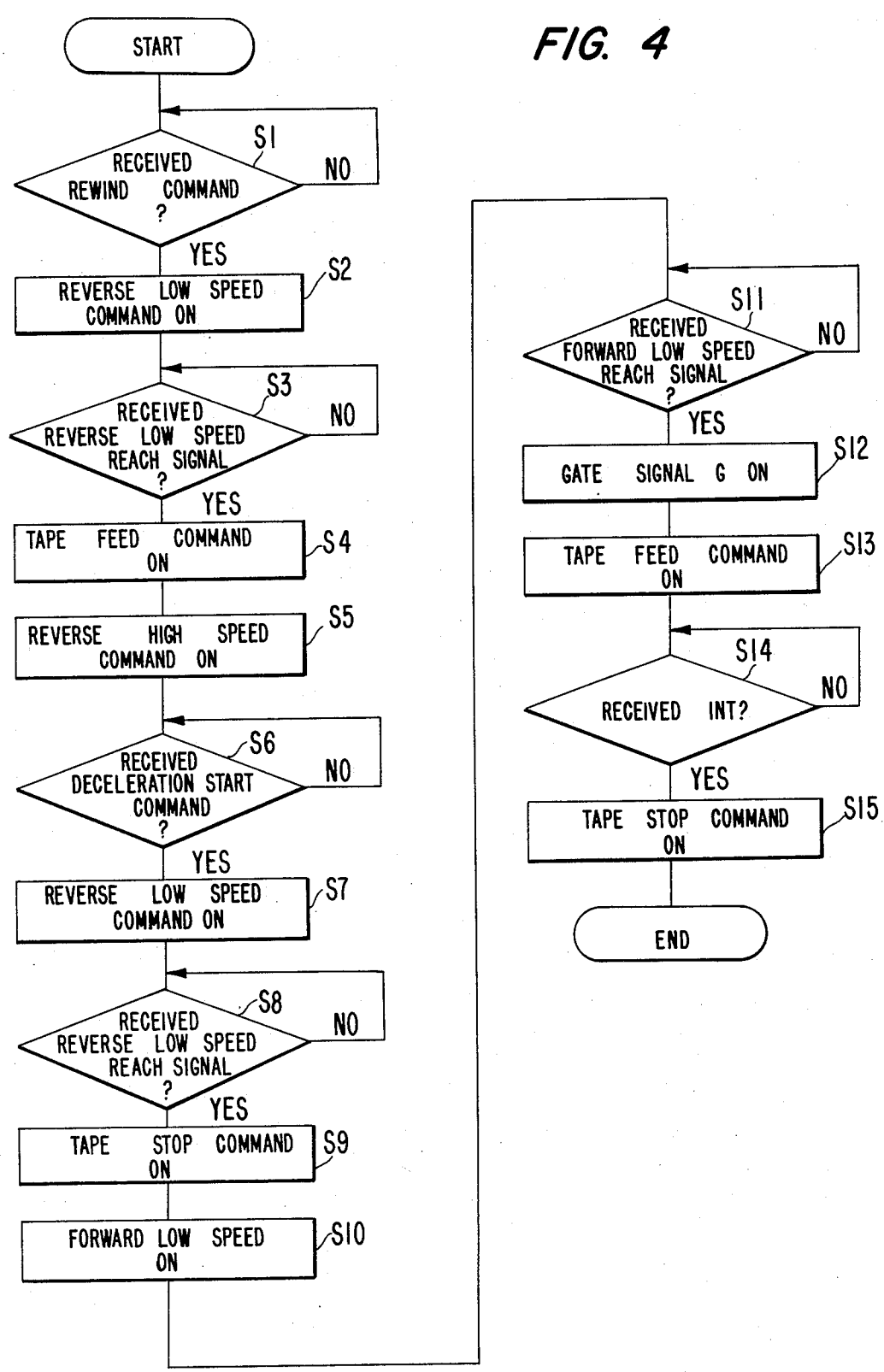

REWIND CONTROL UNIT FOR A TAPE READER

TECHNICAL FIELD

The present invention relates to a rewind control unit for a tape reader.

BACKGROUND ART

Conventionally, a tape reader which reads information punched in an NC (Numerical Control) tape or the like is arranged so that, upon receipt of a rewind command, it immediately switches a capstan motor from forward to high-speed reverse rotation to start rewinding of the tape and, upon detection of a rewind stop code by a read element, instantly actuates a brake magnet to stop the tape feed.

With such a method, however, each tension arm moves greatly at the start of rewinding of the tape. Therefore, in order to hold this movement within a permissible range, it is necessary to speed up the response of a reel motor. This necessitates the use with a large motor of a large torque, which, however, causes a large current flow, thereby leading to problems from increased heat generation and increased power dissipation. Further, since it is necessary to halt the tape at the position of the rewind stop code immediately upon its detection, the brake magnet is required to have excellent response. This calls for a large current flow to the brake magnet, and hence also increases heat generation.

SUMMARY OF THE INVENTION

An object of the present invention is to provide a rewind control unit for a tape reader which permits miniaturization of the reel motor and which consumes less power.

Another object of the present invention is to provide a rewind control unit for a tape reader which ensures that the tape is stopped at the position of a rewind stop code where deceleration of the tape has started, even if the response of the brake magnet is somewhat poor.

The rewind control unit of the present invention is an improved rewind control unit for a tape reader in which a tape paid out from a supply reel and taken up on a take-up reel, is held in a taut condition by means of tension arms. A light source and a read element are each disposed on one side of the tape so that information punched in the tape is read out by the read element. The rewind control unit of the present invention is provided with speed switching means for switching the rotational speed of a capstan motor to a forward low speed, a reverse low speed and a reverse high speed; a decoder for detecting rewind stop codes punched in the tape; counting means for counting the number of rewind stop codes or sprocket signals detected in the time interval between the detection of the first rewind stop code by the decoder and the stopping of the tape feed; and control means which, upon receiving a rewind command, switches the rotational speed of the capstan motor first to the reverse low speed and then to the reverse high speed to rewind the tape and, which, upon detection of the rewind stop code by the decoder, first stops the tape feed by rotating the capstan motor at the reverse low speed, and then driving the capstan motor in the forward direction at the low speed to feed the tape in the forward direction until rewind stop codes or sprocket signals of the number counted by the counting means, are detected.

In response to the rewind command, the rotational speed of the capstan motor is switched from the forward low speed, to the reverse low speed and after the reverse low speed has been reached, a feed magnet is actuated to rewind the tape. As the rewinding of the tape is started, the rotational speed of the capstan motor is gradually increased to the reverse high speed. When a rewind stop code is detected, the rotational speed of the capstan motor is gradually slowed to the reverse low speed. When the reverse low speed is reached, the brake magnet is actuated to stop the tape feed temporarily. A reversible counter stores the number of sprocket signals or rewind stop codes detected from the time when the first rewind stop code is detected to the time when the tape feed is temporarily stopped. After the tape has stopped, the speed of the capstan motor is switched to the forward low speed. When the forward low speed is reached, the feed magnet is actuated to feed the tape in the forward direction, and the number of detected rewind stop codes or sprocket signals is subtracted from the contents of the reversible counter. When the contents of the reversible counter become zero, the brake magnet is actuated to stop the feed of the tape.

BRIEF DESCRIPTION OF THE DRAWINGS

FIG. 4 is a flowchart of an example of the rewind control processing performed by the microprocessor 50;

DETAILED DESCRIPTION OF THE PREFERRED EMBODIMENT

Figure 1:
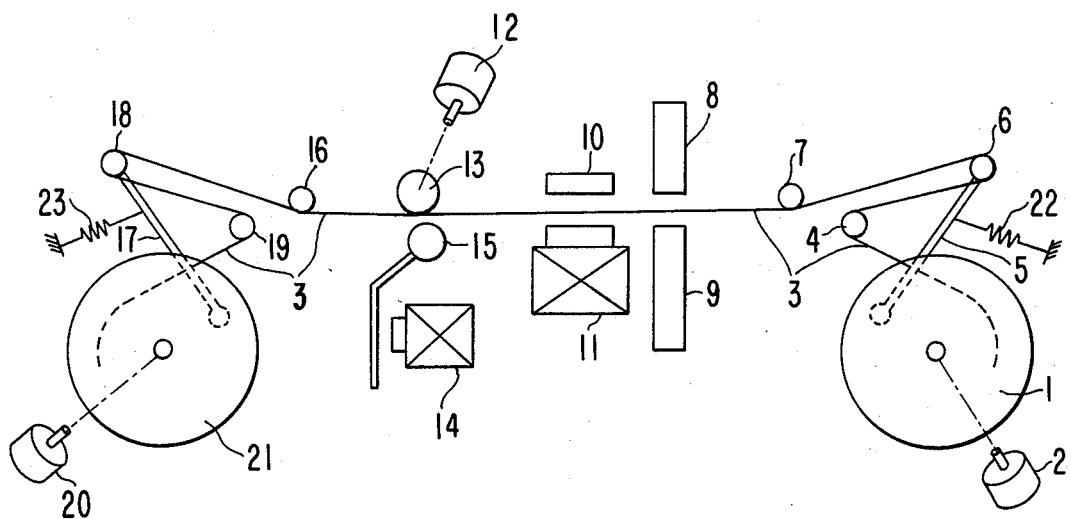
FIG. 1 is a diagram for explaining the arrangement of the tape reader to which the present invention is applied.
Figure 5:
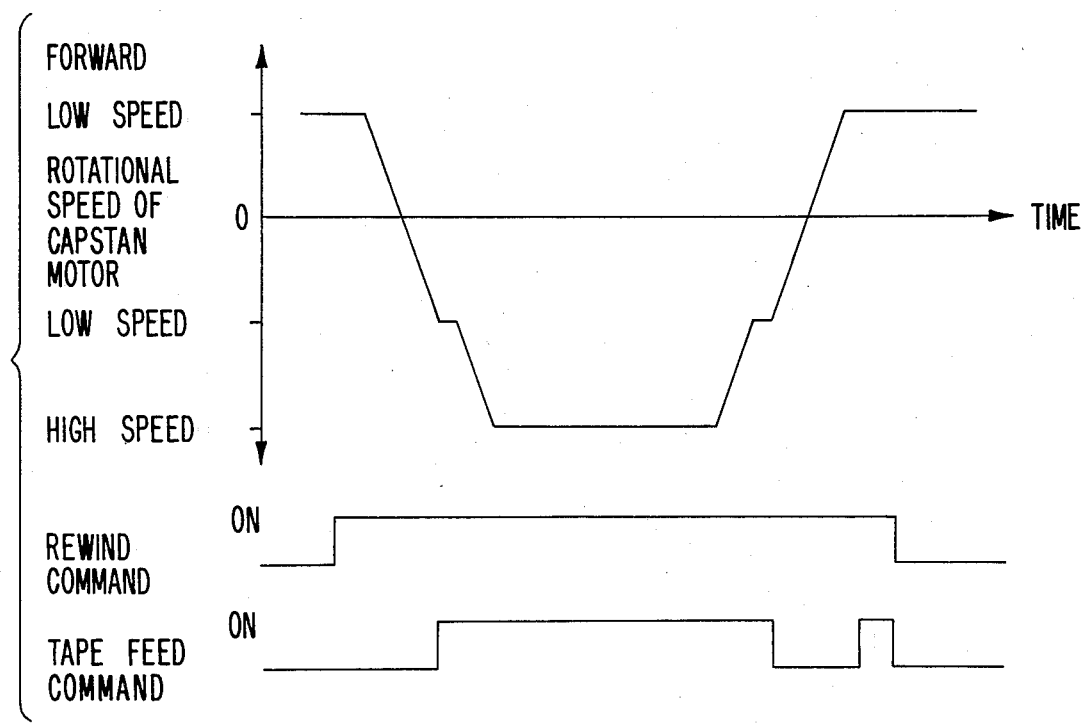
FIG. 5 is a graph of temporal variations in the rotational speed of a capstan, a rewind command and a tape feed command when rewind control is accomplished.

In FIG. 1, reference numeral 1 indicates a supply reel and 2 a supply reel motor for driving the supply reel. A paper tape 3, which is drawn out from the supply reel 1, is guided by a guide roller 4, a guide roller 6 of a supply side tension arm 5 and a fixed guide roller 7 to thread between a light source 8, such as a light emitting element array, and a read element 9 such as a photo transistor array and between a brake shoe 10 and a brake magnet 11 for attracting the brake shoe 10. The tape 3 is gripped between a capstan roller 13 which is driven by a motor 12 and a pinch roller 15 which cooperates with the capstan roller to feed the paper tape 3, which is then guided by a fixed guide roller 16, a guide roller 18 of a take-up reel side tension arm 17 and a fixed guide roller 19 and wound up onto a take-up reel 20. The supply reel side tension arm 5 and the take-up reel side tension arm 17 are biased by springs 22 and 23, respectively, to apply tension to the paper tape 3.

Figure 2:
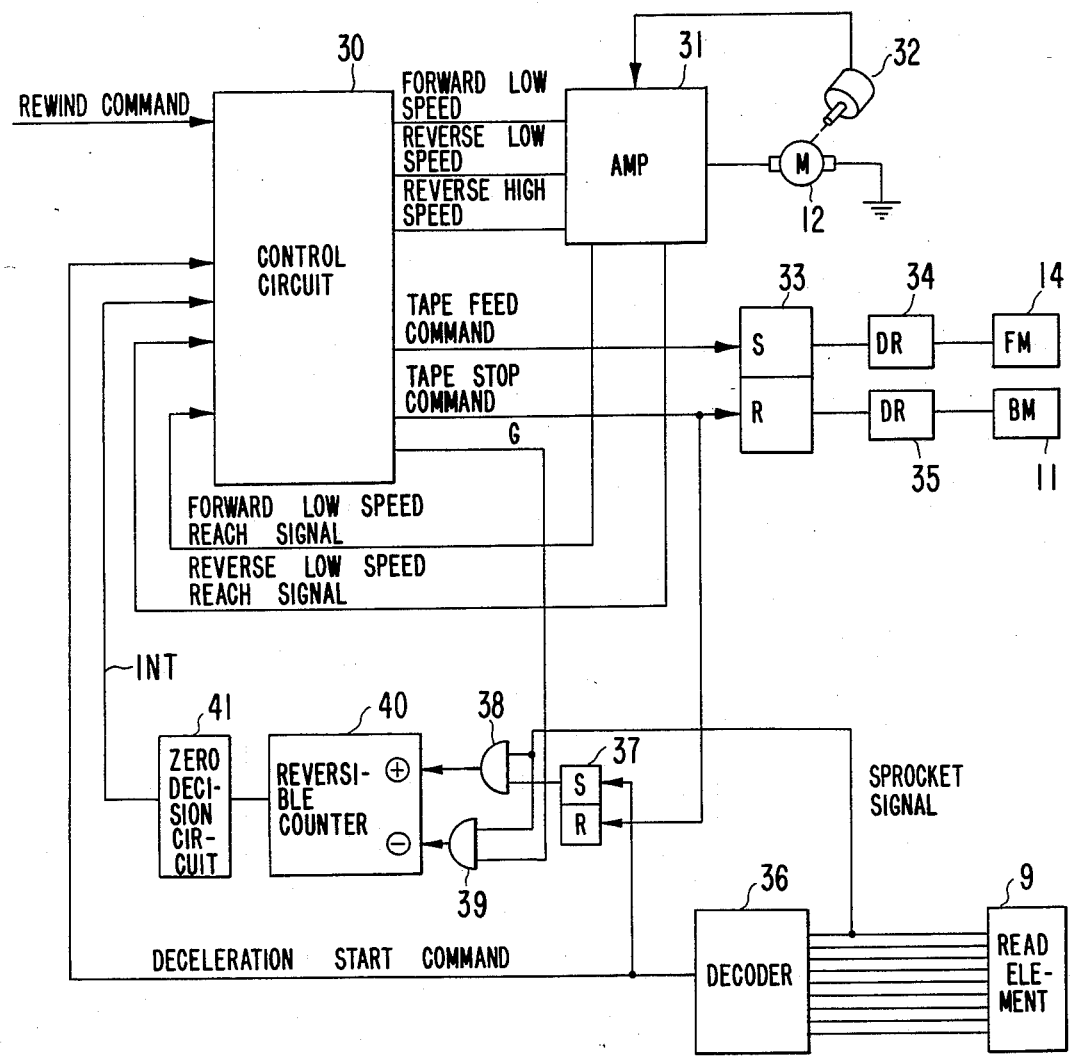
FIG. 2 is a block diagram of the principal part of the rewind control unit of the present invention.
Figure 3:
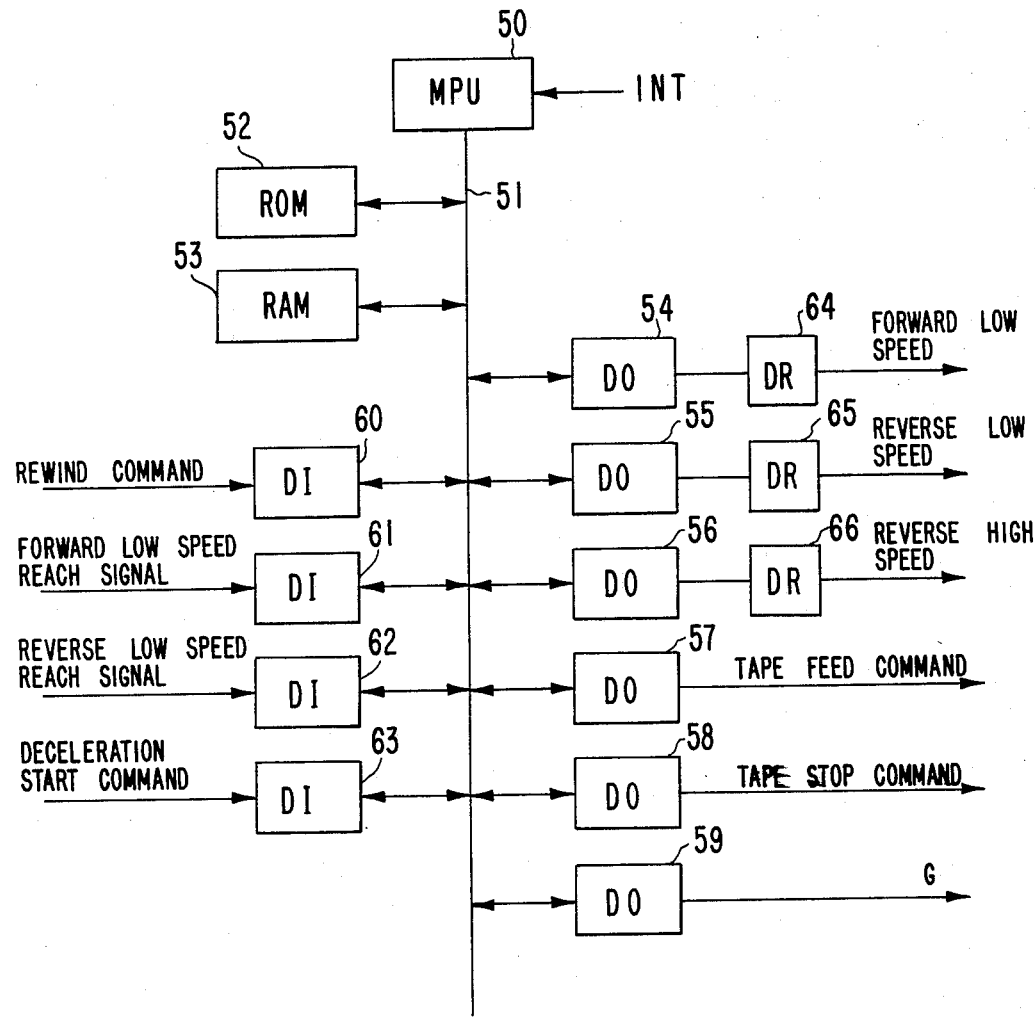
FIG. 3 is a block diagram of the principal part of an embodiment of the internal arrangement of a control circuit 30.

In FIG. 2, like parts corresponding to those in FIG. 1 are identified by the same reference numerals. Reference numeral 30 indicates a control circuit, 31 an amplifier for driving the capstan motor 12, 32 a speed detector such as a tacho generator, 33 a flip-flop, 34 and 35 drivers, 36 a decoder for detecting rewind stop codes, 37 a flip-flop, 38 and 39 AND circuits, 40 a reversible counter which is counted up by output pulses from the AND circuit 38 and counted down by output pulses from the AND circuit 39, and 41 a zero decision circuit for detecting that the contents of the reversible counter 40 have become zero. In FIG. 3 which shows the arrangement of the control circuit 30 implemented through use of a microprocessor, a bus 51 of a microprocessor 50 has connected thereto such peripheral circuits as a ROM 52 which has stored therein various programs, a RAM 53 which is used for calculations and the like, data output devices 54 to 59 and data input devices 60 to 63. Connected to the data output devices 54 to 56 are drivers 64 to 66.

Referring to the flowchart of FIG. 4, upon application of a rewind command to the control circuit 30 from a rewind command generator (not shown) such as a push button, the microprocessor 50 of the control circuit 30 issues a reverse low speed command to the amplifier 31 via the data output device 55 and the driver 65 (S1, S2). When receiving the reverse low speed command, the amplifier 31 switches the direction of rotation of the capstan motor 12 to the reverse direction and changes its speed to a low speed. The rotational speed of the capstan motor 12 is detected by the speed detector 32 and fed back to the amplifier 31, and when a predetermined reverse low speed is reached, the amplifier 31 provides a reverse low speed reach signal to the microprocessor 50 via the data input device 62 of the control circuit 30 (S3).

After being supplied with the reverse low speed reach signal, the microprocessor 50 sends a tape feed command via the data output device 57 to the set terminal of the flip-flop 33, by which the driver 34 is caused to excite the feed magnet 14, thereby starting the feed of the paper tape 3 (S4). Then the microprocessor 50 provides a reverse high speed command to the amplifier 31 via the data output device 56 and the driver 66 (S5), driving the capstan motor 12 at a high speed.

While the paper tape 3 is being rewound, the output of the read element 9 is decoded by the decoder 36. When a rewind stop code punched in the paper tape 3, is detected by the decoder 36, a deceleration start command is provided from the decoder 36 to the microprocessor 50 via the data input device 63 of the control circuit 30. Further, the flip-flop 37 is set by the output of the decoder 36 to enable the AND circuit 38, permitting the application of sprocket signals to the + terminal of the reversible counter 40.

Upon receiving the deceleration start command (S6), the microprocessor 50 issues the reverse low speed command to the amplifier 31 via the data output device 55 and the driver 65 (S7), changing the speed of the capstan motor 12 to the low speed. When the speed of the capstan motor 12 reaches the reverse low speed, the amplifier 31 applies the reverse low speed reach signal to the control circuit 30. Reading this signal via the data input device 62 (S8), the microprocessor 50 sends a tape stop command via the data output device 58 to the reset terminal of the flip-flop 33 (S9). In consequence, the brake magnet 11 is excited by the driver 35 to stop the feed of the paper tape 3. Further, the flip-flop 37 is reset by the tape stop command. Since the AND circuit 38 is open when the rewind stop code is detected, as mentioned previously, the reversible counter 40 counts the number of sprocket signals from the time when the rewind stop code is detected to the time when the feed of the paper tape 3 is stopped.

After delivering the tape stop command, the microprocessor 50 then issues a forward low speed command to the amplifier 31 via the data output device 54 and the driver 64, driving the capstan motor 12 at the low speed in the forward direction (S10). Then, when receiving a forward low speed reach signal from the amplifier 12 via the data input device 61 (S11), the microprocessor provides a gate signal G via the data output device 59 to the AND circuit 39, permitting the application of the sprocket signals to the − terminal of the reversible counter 40 (S12).

After the above operation, the microprocessor 50 sends a tape feed command via the data output device 57 to the set terminal of the flip-flop 33 (S13), feeding the paper tape 3 in the forward direction. In the course of the forward tape feed the sprocket signals from the read element 9 are applied via the AND circuit 39 to the − terminal of the reversible counter 40, subtracting its contents. When the contents of the reversible counter 40 become zero, it is detected by the zero decision circuit 41, from which an interruption signal INT is provided to the control circuit 30. When supplied with the interruption signal INT, the microprocessor 50 of the control circuit 30 issues the tape stop command via the data output device 58 to the flip-flop 33 (S14, S15), stopping the feed of the paper tape 3.

Figure 6:
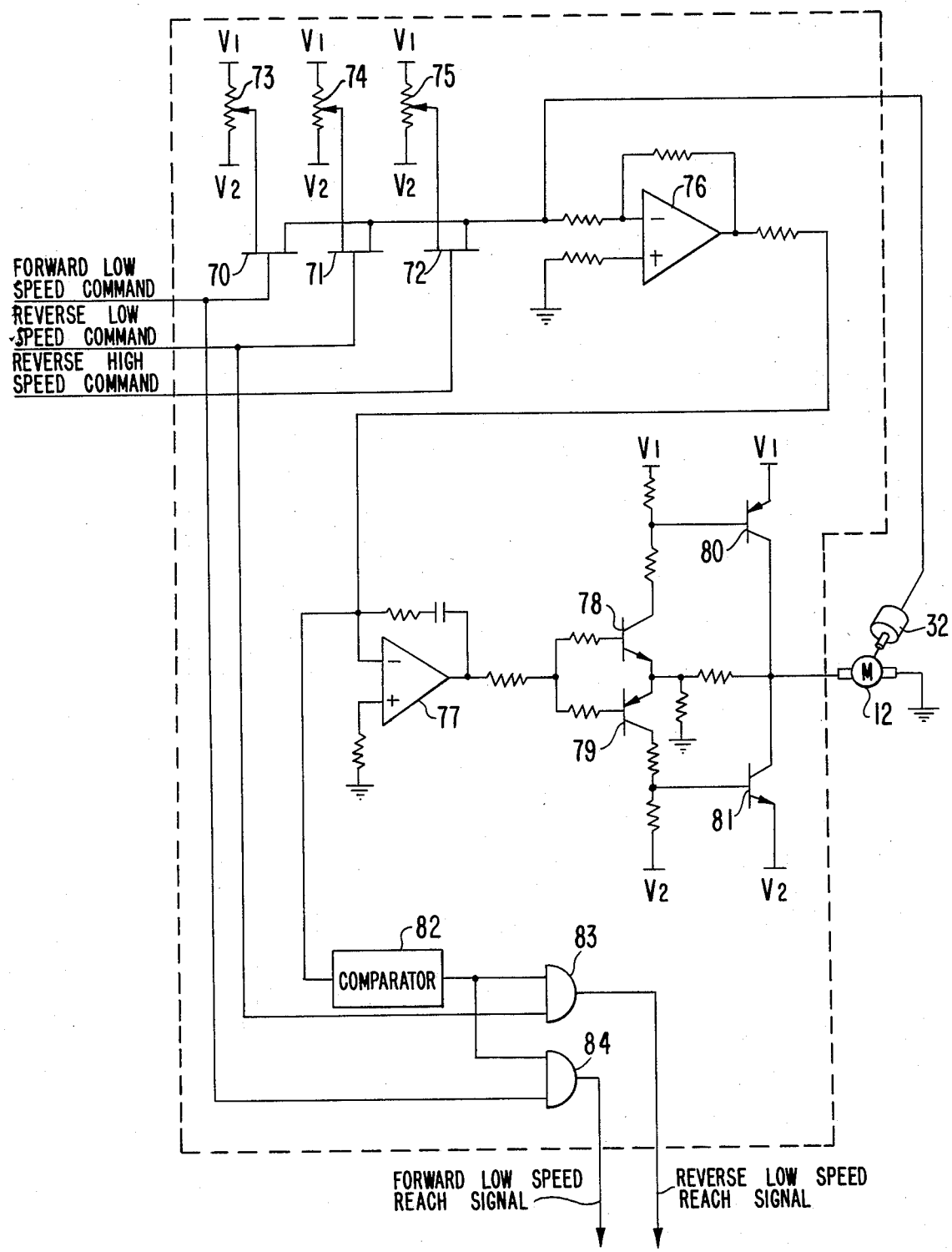
FIG. 6 is a circuit diagram of an embodiment of the amplifier 31 of FIG. 2.

FIG. 6 is a circuit diagram of an embodiment of the amplifier 31. A transistor 70 which is turned ON by the forward low speed command, a transistor 71 which is turned ON by the reverse low speed command, a transistor 72 which is turned ON by the reverse high speed command, variable resistors 73 to 75 which are connected across power sources $V_1$ and $V_2$ to generate voltages necessary for the forward high speed, the reverse low, and the reverse high speed and an operational amplifier 76 form an adder. The adder supplies an integration circuit, which is formed by an operational amplifier 77, with a voltage which is controlled, so that the feedback voltage of the speed detector 32 becomes equal to the input voltage of the operational amplifier 76. Transistors 78 to 81 constitute a drive circuit for the capstan motor 12. In accordance with the output of the integration circuit the transistor 80 or 81 is turned ON to control the direction of rotation and the speed of the capstan motor 12. A comparator 82 compares the input voltage of the operational amplifier 77 with a reference voltage, and detects whether or not the speed of the capstan motor 12 has reached the reverse low speed or forward low speed. The comparator output is ANDed with the reverse low speed command and the forward low speed command by AND circuits 83 and 84, respectively, to generate the forward and reverse reach signals.

The present invention is not limited specifically to the above embodiment but various other modifications and variations may be effected. For example, it is also possible to employ an arrangement in which the number of rewind stop codes detected in the time interval between the detection of the first rewind stop code and the temporary stopping of the tape feed is stored in the reversible counter, the number of rewind stop codes detected during the forward low speed feed of the tape is subtracted from the contents of the reversible counter and when its contents become zero, the brake magnet is actuated to stop the tape feed.

As described above, according to the present invention, when a rewind command is received, the speed of the capstan motor is switched first to the reverse low speed and then to the reverse high speed, so that the movement of each tension arm is less than in the case where the speed of the capstan motor is switched directly to the reverse high speed as in the prior art. Therefore, even if the response characteristics of the reel motor are somewhat poor, there is no possibility of the tension arm exceeding its permissible range of movement. This offers the advantage that the reel motor may be a small one, which generates less heat and consumes less power. Moreover, when a rewind stop code is detected, the tape is not instantly stopped but stopped after once overshooting the rewind stop code, so the brake magnet need not have excellent response. Therefore, the brake magnet can also be miniaturized. Furthermore, since the overshoot is detected by counting the number of sprocket signals or rewind stop codes and the tape is returned by the detected amount, the tape can be stopped accurately at the position of the rewind stop code which is first detected during the rewinding of the tape. In the case where such control is not effected, and after stopping the tape feed, the tape is returned by the low-speed forward rotation of the capstan motor until the rewind stop code is detected again, if a plurality of rewind stop codes are punched in succession (as is typical), the tape cannot be stopped at the position of the first rewind stop code. Accordingly, the situation arises where when the tape is fed in the forward direction, a rewind stop code is immediately detected and the tape feed is incorrectly stopped at this rewind stop code. The present invention is free from this disadvantage.

What is claimed is:

1. A rewind control unit for a tape reader in which a tape is paid out from a supply reel and taken up on a take-up reel, in which the tape is stretched by tension arms in a taut condition, and in which a light source and a read element are each disposed on one side of the tape so that information punched in the tape is read out by the read element, comprising:
   a capstan motor;
   speed switching means for switching the rotational speed of the capstan motor to one of a forward low speed, a reverse low speed and a reverse high speed;
   a decoder, connected to the read element, for detecting sprocket signals or rewind stop codes punched in the tape;
   counting means for counting the number of rewind stop codes or sprocket signals detected from the time a first rewind stop code is detected to the time when the tape is stopped; and
   control means, connected to receive a rewind command, for controlling said speed switching means to switch the rotational speed of said capstan motor first to the reverse low speed and then to the reverse high speed to rewind the tape when the rewind command is received, and for controlling said speed switching means to stop the tape feed when the first rewind stop code is detected by said decoder by rotating the capstan motor in the reverse direction at the low speed, and then driving the capstan motor in the forward direction at the low speed to feed the tape in the forward direction until the number of rewind stop codes or sprocket signals counted by said counting means are detected by said decoder.

2. A rewind control unit for a tape reader having a tape which is fed and rewound by a capstan motor having a forward low speed, a reverse low speed and a reverse high speed, comprising:
   detecting means for detecting rewind stop codes punched in the tape;
   counting means for counting the number of rewind stop codes detected by said detecting means from the time a first rewind stop code is detected by said detecting means to the time when reverse feeding of the tape is stopped; and
   control means, connected to receive a rewind command signal, for setting the rotational speed of the capstan motor to the reverse low speed and then the reverse high speed to rewind the tape when the rewind command signal is received, said control means for stopping the rewinding of the tape by stopping the reverse feeding of the tape and controlling the rotational speed of the capstan motor to be the forward low speed to feed the tape in the forward direction until the number of rewind stop codes counted by said counting means is detected by said detecting means.

3. A rewind control unit as set forth in claim 2, wherein said control means comprises a microprocessor unit.

4. A rewind control unit as set forth in claim 3, wherein said detecting means comprises:
   a light emitting element positioned on one side of the tape;
   a reading element positioned on the opposite side of the tape from the light emitting element; and
   a decoder circuit, connected to said reading element, for decoding the output of said read element to determine when a rewind stop code is detected.

5. A rewind control unit as set forth in claim 4, wherein said counting means comprises a reversible counter.

6. A rewind control unit as set forth in claim 5, further comprising a brake for stopping the tape, wherein said control means actuates the brake when said microprocessor unit generates a tape stop command.

* * * * *